United States Patent
Cantolino

(10) Patent No.: US 6,895,771 B1
(45) Date of Patent: *May 24, 2005

(54) DUAL P-TRAP AND VALVE AIR CONDITIONER DISCHARGE WATER SAVER SYSTEM

(76) Inventor: Christopher R. Cantolino, 7704 - 18th Ave., NW, Bradenton, FL (US) 34209

( * ) Notice: Subject to any disclaimer, the term of this patent is extended or adjusted under 35 U.S.C. 154(b) by 0 days.

This patent is subject to a terminal disclaimer.

(21) Appl. No.: 10/420,665

(22) Filed: Apr. 22, 2003

(51) Int. Cl.[7] .............................. F28G 9/00; F25D 21/14
(52) U.S. Cl. ............................ 62/303; 62/285; 62/288
(58) Field of Search .......................... 62/303, 285, 288, 62/291, 279; 210/268, 282, 293, 300

(56) References Cited

U.S. PATENT DOCUMENTS

| | | | | |
|---|---|---|---|---|
| 4,066,551 A | * | 1/1978 | Stern ........................... | 210/282 |
| 5,269,919 A | * | 12/1993 | von Medlin ................. | 210/256 |
| 5,397,468 A | * | 3/1995 | Chomka et al. ............ | 210/232 |
| 5,402,813 A | | 4/1995 | Keen | |
| 5,694,786 A | * | 12/1997 | Huang ......................... | 62/285 |
| 5,980,761 A | * | 11/1999 | Boissie et al. .............. | 210/807 |
| 6,041,611 A | * | 3/2000 | Palmer ......................... | 62/286 |
| 6,182,453 B1 | * | 2/2001 | Forsberg ...................... | 62/125 |
| 6,299,765 B1 | * | 10/2001 | Fabrizio ..................... | 210/169 |
| 6,464,854 B2 | * | 10/2002 | Andrews et al. ............ | 205/628 |

* cited by examiner

Primary Examiner—Chen Wen Jiang
(74) Attorney, Agent, or Firm—Dorothy S. Morse

(57) ABSTRACT

A gravity-assisted water saving system, and method of use, utilized for collecting condensate from an air conditioning system, sanitizing it, and then diverting it for constructive use. It has a chamber with an inclined bottom surface, a removable basket for containing tablets used for sanitizing swimming pool water or bleach tablets used for laundry sanitizing purposes, a double P-trap assembly on its water inlet side that prevents sanitizing vapors from entering the air conditioning system to which it is connected, a removable cap sealing its top opening to prevent escape of sanitizing vapors into the atmosphere, and an optional mounting bracket for enhanced stabilization against a stationary object. Inflow tubing connected to the chamber permits ready attachment of the present invention to an air conditioning condensate discharge pipe, while a discharge tube in an inferior position transports reclaimed water to its location of subsequent use.

8 Claims, 11 Drawing Sheets

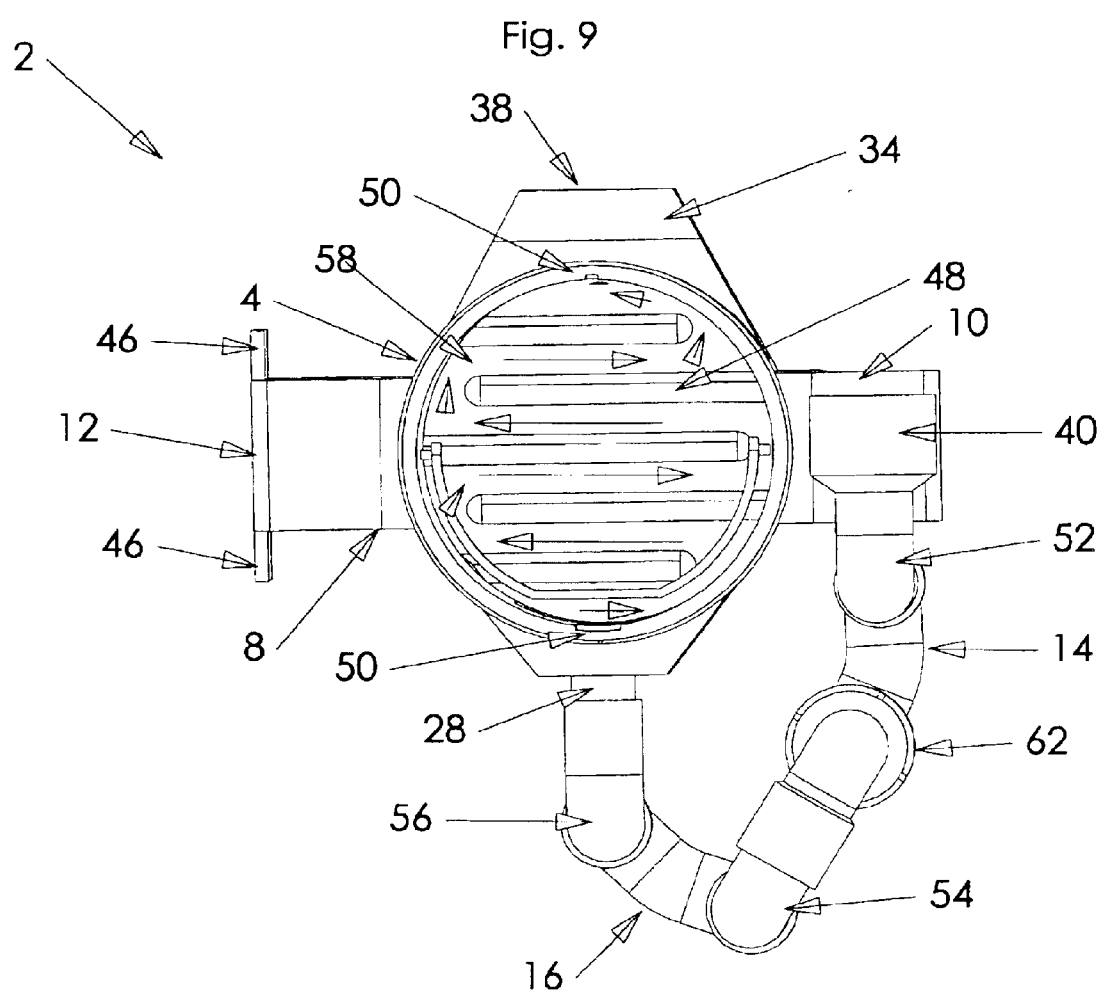

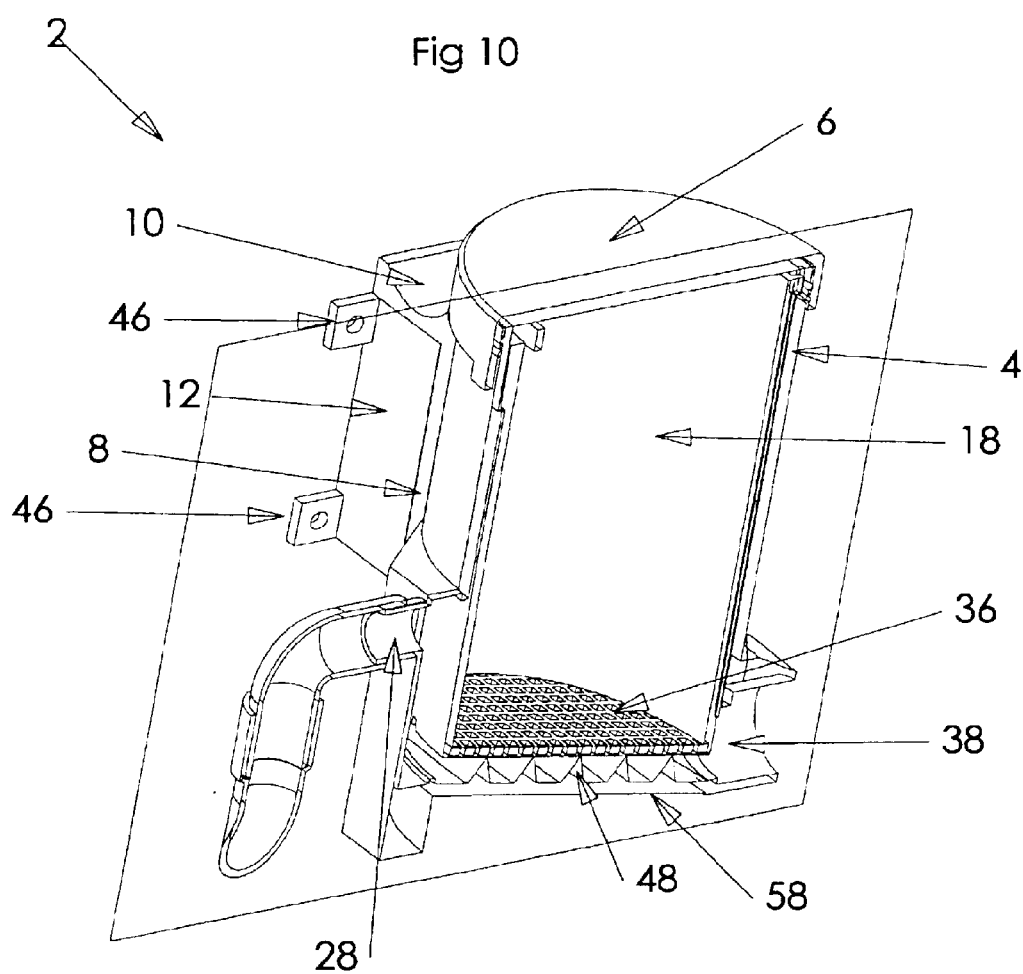

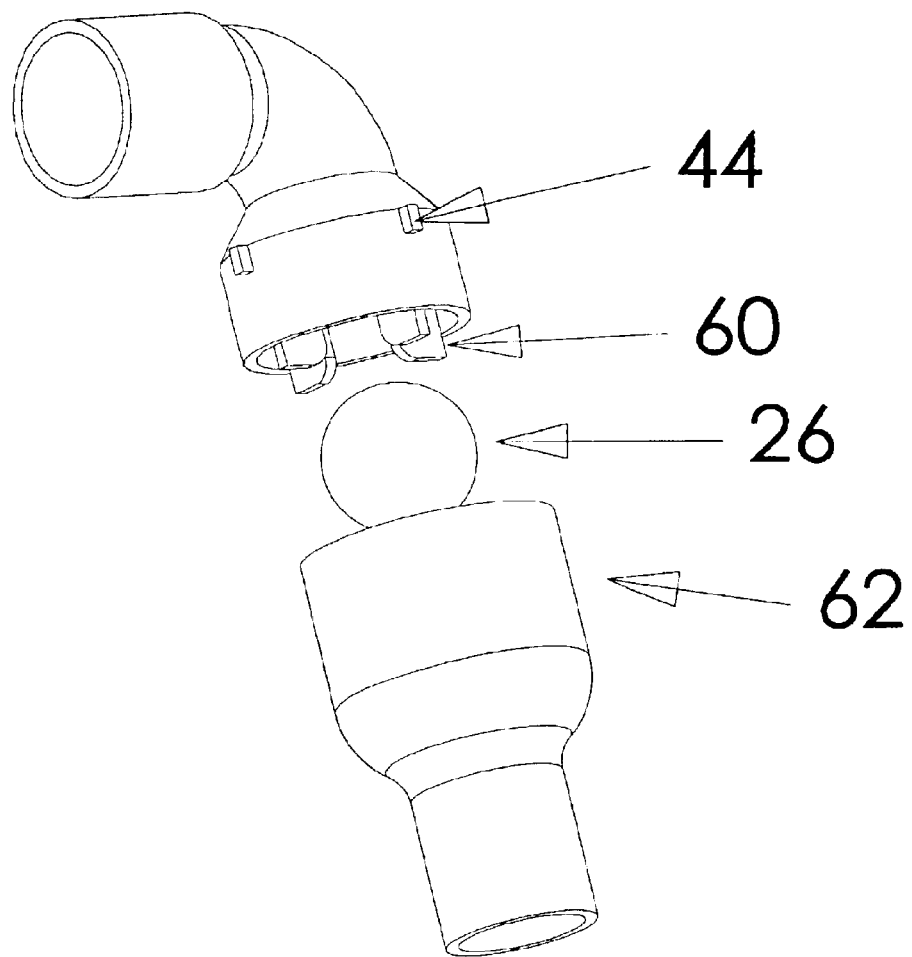

DUAL P-TRAP AND VALVE AIR CONDITIONER DISCHARGE WATER SAVER SYSTEM

CROSS-REFERENCES TO RELATED APPLICATIONS

This patent application is based in part upon the same subject matter disclosed in U.S. patent application Ser. No. 10/074,704, filed by the same inventor on Feb. 13, 2002, for an air conditioner discharge water saver system, which was based upon U.S. provisional patent application 60/316,916, filed by the same inventor on Sep. 1, 2001, and all benefit thereof to which the inventor is entitled is requested herein.

BACKGROUND OF THE INVENTION

1. Field of the Invention

This invention relates to recovery devices for water extracted from the atmosphere, specifically to a gravity-assisted water saver system, and a method for its use, that can be connected so as to collect the condensate from an air conditioning system, sanitize it with vapors released from dissolvable tablets, such as the chlorination tablets used for treating swimming pool water or bleach tablets used for laundering purposes, and then divert it for constructive use without the condensate coming into direct contact with the sanitizing treatment tablets used with the system.

2. Description of the Related Art

Air conditioning condensate is generally an unutilized resource. The condensate extracted from air cooled by automobile air conditioning systems drips continuously in small quantities onto the pavement or parking surface beneath the associated vehicle, whereafter it evaporates into the atmosphere. Similarly, the slow drip of water extracted from the air cooled by residential air conditioning systems, and other devices using air for other similar cooling, is typically directed to an outside location, where it is allowed to fall onto the ground under a discharge pipe for eventual evaporation. However, a significant amount of condensate is produced over time, particularly by residential air conditioning systems. With the use of reclaimed water becoming more urgently needed and commonly accepted for an ever increasing variety of non-potable and potable uses, as a result of the burgeoning populations and escalated depletion of potable water reserves worldwide, it would be useful to find an efficient and cost-effective means by which to reclaim air conditioning condensate and divert it to a useful purpose, such as toilet flushing, pressure washing, other cleaning purposes, and replacement of swimming pool water that is continuously being lost to evaporation and needs to be maintained above a minimum level that assures proper pump operation in associated filtration systems.

One reason for a prior lack of interest in the recovery of air conditioning condensate is that by the time it is discharged from the air conditioning system, it is generally laden with algae, bacteria, viruses, and/or other disease causing agents. Also, chlorinators commonly used for other purposes, such as those employed for the treatment of swimming pool water, were generally too large, too overpowering for the comparatively small amount of condensate that would require chlorination, and/or too expensive to allow easy adaptation for air conditioning condensate reclamation. However, since most homes in warm climates have air conditioning systems as well as swimming pools, and further since potable water is often used to replace the continual amount of swimming pool water lost to evaporation, a chlorinating system that could appropriately sanitize air conditioning condensate for its use as replacement water for swimming pools would preserve significant amounts of potable water over time, and provide a benefit to the public, particularly where less groundwater depletion would be involved. For homes having air conditioning systems but not a pool, air conditioning condensate could be reclaimed for cleaning use, flushing toilets, or any other gray water use that may arise. The present invention provides such a system, which has safety and manufacturing advantages over previous systems made for the same purpose by the inventor herein.

BRIEF SUMMARY OF THE INVENTION

Objectives and Advantages

The primary object of the present invention is to provide a sanitizing system for air conditioning condensate so that it can be reclaimed and diverted for constructive use. It is also an object of the present invention to provide a sanitizing system for air conditioning condensate that is gravity-assisted for cost-effective operation. It is a further object of the present invention to provide a sanitizing system for air conditioning condensate intended for diversion to a swimming pool, that can maintain chlorine levels sufficiently high in the condensate to kill most viruses and microorganisms, including algae and bacteria, but not so high as to be inconsistent with chlorine levels needed in the recipient swimming pool. A further object of the present invention to provide a sanitizing system for air conditioning condensate and method that prevents tablet released vapors from backing up into the air conditioning system from which the condensate is derived, and/or from being discharged into the atmosphere. It is also an object of the present invention to provide a sanitizing system for air conditioning condensate that is adapted for use with readily available sources of chlorine products commonly employed for swimming pool water sanitization purposes, or laundry bleaching products, that are provided in tablet form and treats the collected condensate without it ever coming into direct contact with the tablets. A further object of this invention is to provide a sanitizing system for air conditioning condensate that is easily adapted for prompt installation with new air conditioning systems and/or retrofit to existing air conditioning systems.

As described herein, properly manufactured and used, the present invention would provide a sanitizing system for air conditioning condensate that reclaims it, treats it with sanitizing vapors that rid it of algae, bacteria, viruses, and other disease causing agents, and then diverts it for subsequent non-potable use instead of allowing it to be discarded as a waste by-product. The present invention is a small unit that can be used for new construction, as well as a retrofit unit for existing construction, and it is gravity assisted so it requires no electricity to operate. An optional mounting bracket that can be slidably engaged with one of the support brackets attached to the outside surface of the chlorination chamber permits secure connection of the chlorination chamber to a stationary object. Quick installation of the mounting bracket is contemplated, as well as prompt sliding engagement of one of the support brackets to the mounting bracket and rapid removal of the chlorination chamber from its secured position when desired. Also, the most preferred embodiment of the present invention is designed with all p-trap components, connective tubing, the float ball, and the mounting bracket being able to fit within the basket in the chlorination chamber for efficient packaging, transport, and sale, since only the chlorination chamber with its cover and support brackets will be initially visible to a purchaser. Once the present invention is transported to the site of its intended use, its p-trap and tubing components can easily be removed from the basket and joined to one another in proper order via PVC cement or other bonding agents. The cover and mounting bracket must remain separable from the chlorination chamber. When swimming pool use is contemplated for the treated condensate, the present invention would have a chlorination chamber with a substantially round cross-sectional configuration that is slightly larger than the type of chlorine tablet typically used for swimming pool water sanitization and further configured to maintain chlorine levels in the reclaimed water within a range sufficiently high for killing microorganisms, including bacteria and algae, but low enough to be consistent with levels considered acceptable for swimming pool use. When other uses for the treated condensate are contemplated, such as but not limited to flushing toilets and/or gray water cleaning purposes, laundry bleaching tablets could be substituted for the swimming pool chlorine tablets. Since it is gravity-assisted and does not require the expense of a pump, the present invention is cost-effective for widespread use. To assist movement of the air conditioning condensate toward the discharge opening of the chlorination chamber, the bottom surface of the chlorination chamber is inclined. It also contains ridges that divert the collected condensate laterally across the bottom surface of the chlorination chamber to enhance the exposure time of the condensate to the sanitizing vapors of the tablets positioned in the basket that reach the condensate through the mesh bottom surface of the basket. The removable basket assists in the easy and efficient addition of new treatment tablets to the chlorination chamber, with the basket having a pivoting handle and a slanted bottom surface that has the same degree of incline provided in the chlorination chamber's bottom surface so that the basket substantially fills the hollow interior of the chlorination chamber. Two P-traps and a float ball therebetween on the inlet side of the chlorination chamber prevent sanitizing vapors released from the dissolvable tablets from entering the air conditioning system from which the condensate is derived, while the cover removably attached to the open top end of the chlorination chamber prevents the sanitizing vapors from escaping into the atmosphere. The removable cover is also configured and dimensioned to permit easy introduction of new chlorine or bleach tablets into the chlorination chamber by maintenance personnel, prevent unwanted debris from inadvertently entering the basket and chlorination chamber, and make the chlorine or bleach tablets positioned within the chlorination chamber inconvenient for access by unauthorized persons, including children. Thus, for this same restrictive purpose, locking, child-resistant, and childproof covers are also considered within the scope of the present invention even though not shown in the attached illustrations herein. Chlorination chambers made at least in part from transparent or translucent materials facilitate the monitoring of sanitizing tablet usage.

The description herein provides preferred embodiments of the present invention but should not be construed as limiting the scope of the air conditioning condensate chlorinating system. For example, variations in the height, inside diameter, and cross-sectional configuration of the chlorination chamber used; the type of chlorine-resistant material from which the chlorination chamber, cover, p-traps, support brackets, tubing, and float ball are made; the configuration and dimension of the ridges used to laterally direct condensate across the bottom surface of the chlorination chamber; the size, pattern, and configuration of the openings in the mesh bottom surface of the basket; the configuration and dimension of support brackets depending from the outer surface of the chlorination chamber; the configuration of the cover used; and the number of p-traps used; other than those shown and described herein, may be incorporated into the present invention. Thus, the scope of the present invention should be determined by the appended claims and their legal equivalents, rather than being limited to the examples given.

BRIEF DESCRIPTION OF THE SEVERAL VIEWS OF THE DRAWINGS

FIG. 9 is a top view of the most preferred embodiment of the present invention that is identical to FIG. 8 with the exception of the basket being removed to reveal the bottom surface of the chlorination chamber, and several parallel ridges in the bottom surface that divert condensate flow laterally across the bottom surface several times between the discharge opening and the inlet opening structure, with arrows and arrowheads showing the direction of condensate flow.

FIG. 10 is a sectional view of the most preferred embodiment of the present invention with the ridges on the bottom surface of the chlorination chamber supporting the angled mesh bottom surface of the basket, the bottom surface of the chlorination chamber being inclined between its inlet opening and its discharge opening, the inlet opening in a raised position with respect to the discharge opening, and the condensate traveling through the inlet structure adjacent to the basket instead of through the basket to reach the bottom surface of the chlorination chamber for sanitizing treatment by way of vapor released from tablets once they are placed within the basket and the basket is positioned within the hollow interior of the chlorination chamber.

FIG. 11 is an exploded view of the valve housing between the two straps in the most preferred embodiment of the present invention, with four stabilizing wings positioned above a float ball.

DETAILED DESCRIPTION OF THE INVENTION

Figure 1:
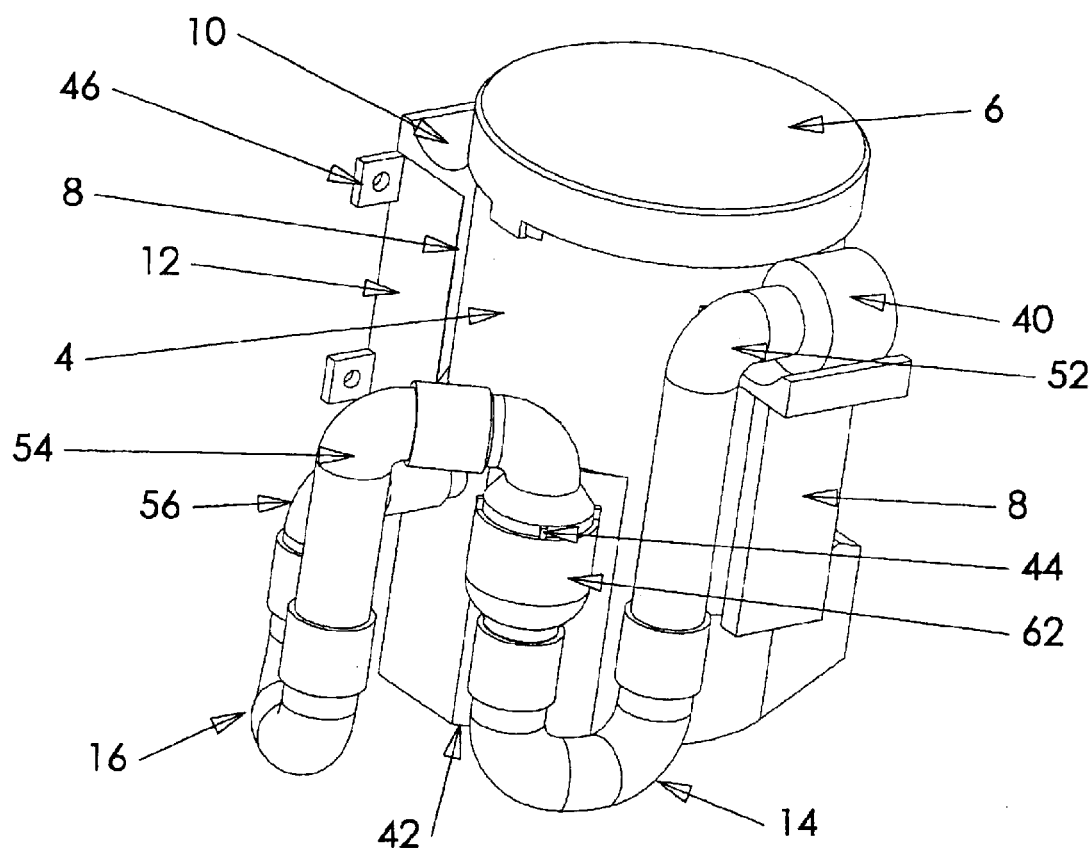
FIG. 1 is a perspective front view of the most preferred embodiment of the present invention having two successive straps positioned between its chlorination chamber and its connection fitting configured for attachment to the discharge pipe of an air conditioning system, with a cover sealing the upper end of the chlorination chamber, opposed support brackets outwardly depending from the outside surface of the chlorination chamber, the connection fitting supported within the concave upper surface of one of the support brackets, and the other support bracket connected to a mounting bracket.
Figure 4:
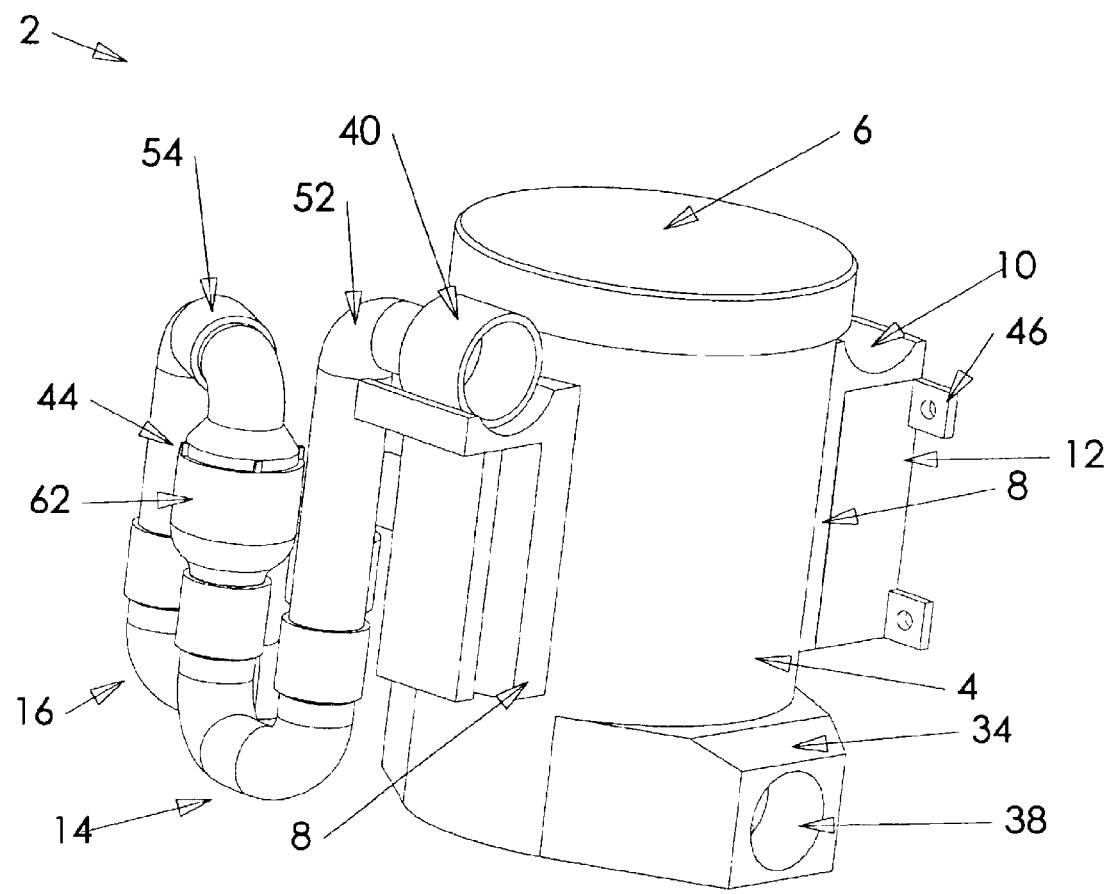
FIG. 4 is a perspective back view of the most preferred embodiment of the present invention having two successive p-traps positioned between its chlorination chamber and its connection fitting configured for attachment to the discharge pipe of an air conditioning system, with a cover sealing the upper end of the chlorination chamber, opposed support brackets outwardly depending from the outside surface of the chlorination chamber, the connection fitting supported within the concave upper surface of one of the support brackets, the other support bracket connected to a mounting bracket, and a lower discharge opening centrally positioned between the support brackets.
Figure 5:
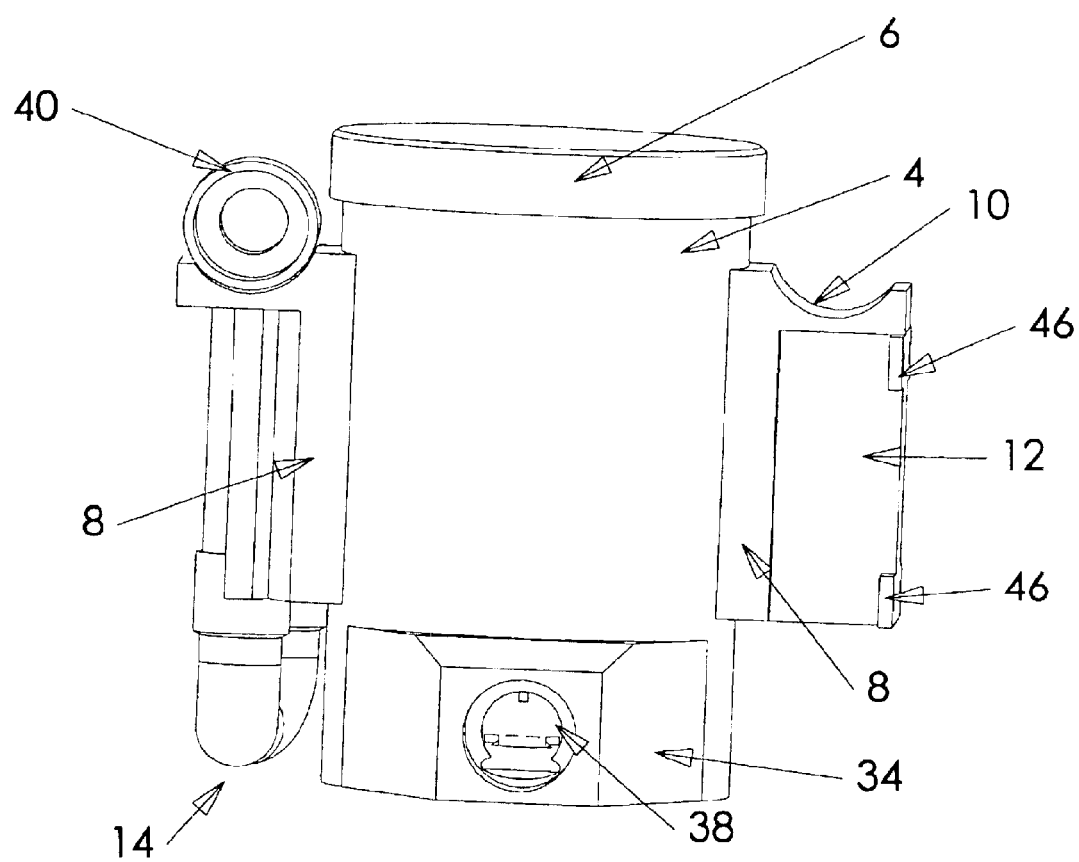
FIG. 5 is a rear view of the most preferred embodiment of the present invention having a cover sealing the upper open end of its chlorination chamber, opposed support brackets outwardly depending from the outside surface of its chlorination chamber, a connection fitting supported within the concave upper surface of one of the support brackets, the other support bracket connected to a mounting bracket, and a lower discharge opening centrally positioned between the support brackets.
Figure 6:
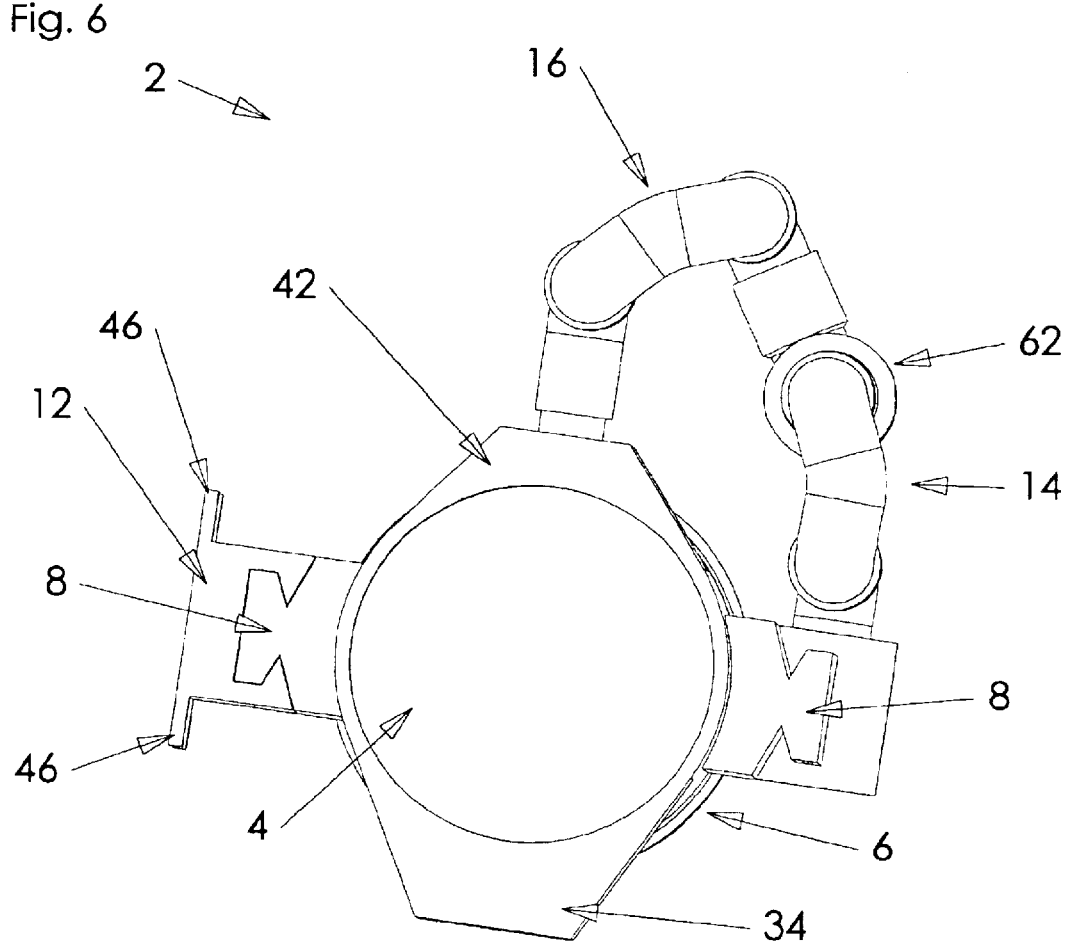
FIG. 6 is a bottom view of the most preferred embodiment of the present invention having a chlorination chamber with opposed support brackets outwardly depending from its outside surface, an inlet opening structure centrally between the opposed support brackets on one side of the chlorination chamber, a discharge opening structure between the opposed support brackets on the other side of the chlorination chamber in a position opposed to the inlet structure, a mounting bracket slidably engaged with one of the support structures, and two successive p-traps connected to the inlet opening structure, with a cover sealing the upper end of the chlorination chamber.

FIGS. 1–10 show the most preferred embodiment 2 of the present invention. FIG. 1 shows a chlorination chamber 4 sealed with a cover 6, and having two successive p-traps 14 and 16 positioned between its raised inlet opening 28, shown in FIG. 2, and its connection fitting 40 that is configured for attachment to the condensate discharge pipe of an air conditioning system (not shown) for collection of otherwise wasted condensate (not shown). Although two p-traps 14 and 16 are sufficient for efficient function of most preferred embodiment 2 in many applications, it is also considered to be within the scope of the present invention to have more than two. In addition, FIG. 1 shows two support brackets 8 attached to chlorination chamber 4 in opposing positions, with a mounting bracket 12 detachably connected to one support bracket 8 and the connection fitting 40 being supported by the other support bracket 8 within a concave upper surface 10. As can be seen in FIG. 6, both support brackets 8 have the same configuration and can be used interchangeably with mounting bracket 12, with the selection of the support bracket 8 to be used with mounting bracket 12 depending upon dictating conditions at the location of use. As further seen in FIG. 1, the first tubing 52 between connection fitting 40 and first p-trap 14 reaches a higher elevation than the second tubing 54 connecting straps 14 and 16. In addition, second tubing 54 reaches a higher elevation than the third tubing 56 leading from second p-trap 16 to the inlet structure 42 surrounding the inlet opening 28 into chlorination chamber 4. A float ball (shown by the number 26 in FIG. 2) is positioned within valve housing 62 located between second tubing 54 and first p-trap 14. Fastening ridges 44 show a preferred means for defining the area within valve housing 62 where float ball 26 can move so that it can be raised upward to allow condensate flow from first p-trap 14 to second p-trap 16 when a sufficient quantity of condensate has accumulated in first p-trap 14 and first tubing 52, but otherwise is lowered by the force of gravity to block fluid communication between first p-trap 14 and second p-trap 16. FIG. 1 also shows fastener mounts 46 on detachable mounting bracket 12, for secure positioning of chlorination chamber 4 to a stationary object (not shown) during use.

Figure 2:
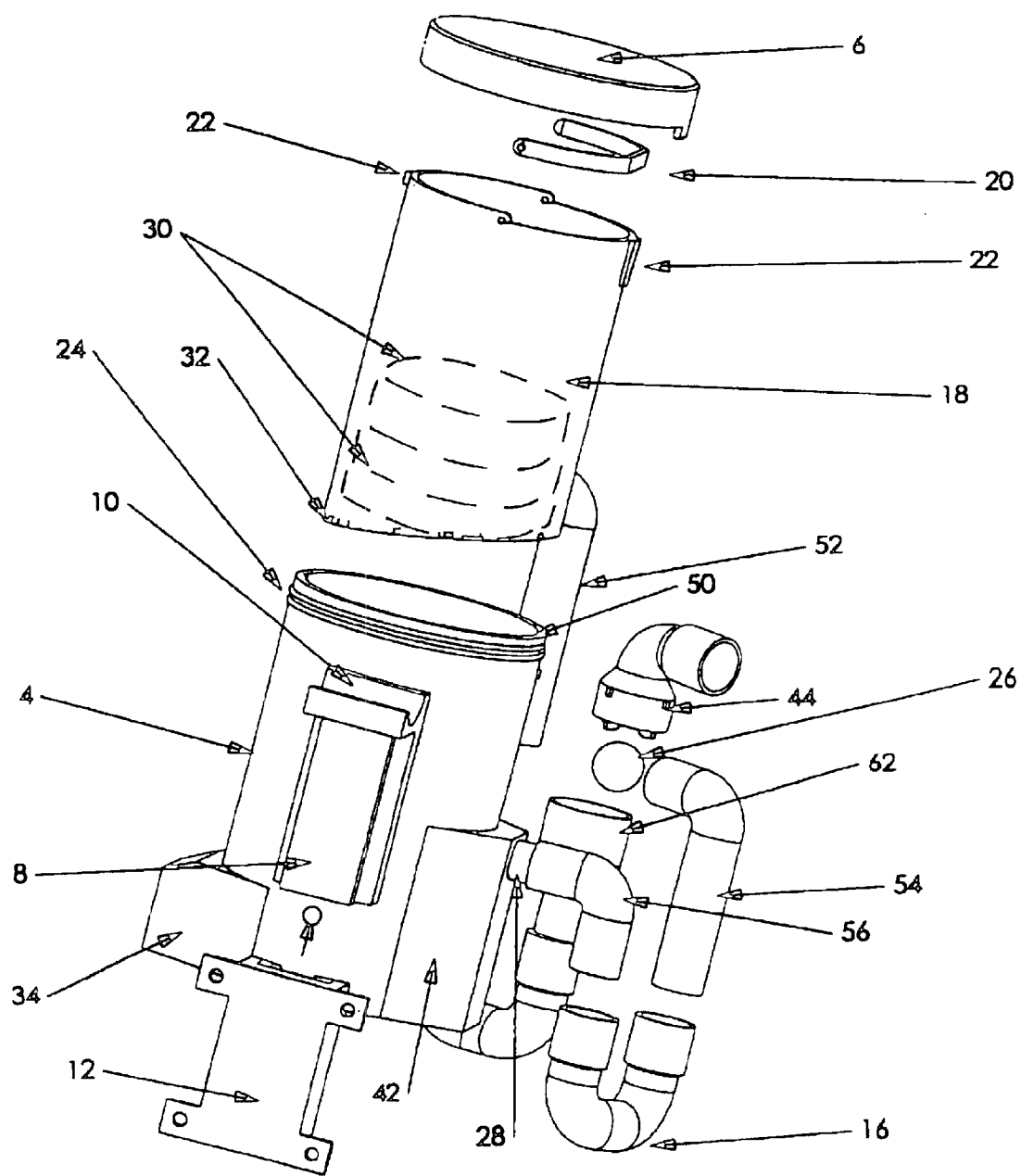
FIG. 2 is an exploded right side view of the most preferred embodiment of the present invention with the cap and basket removed from the chlorination chamber, a float ball shown between P-traps, several treatment tablets stacked in the basket, a mounting bracket poised for vertical sliding engagement with a support bracket, and the inlet opening to the chlorination chamber being in a raised position centrally between the open upper end of the chlorination chamber and its bottom surface.

FIG. 2 shows an exploded view of most preferred embodiment 2, with basket 18 positioned above chlorination chamber 4 and three sanitizing/treatment tablets 30 stacked within basket 18. Although chlorination tablets used for swimming pool treatment purposes and bleach tablets used for laundry purposes are preferred as the choice of treatment tablet 30 used for most purposes, other treatment chemicals in tablet form can also be used to provide the needed level of sanitization for the bacteria-laden and algae-laden condensate before it passes through the discharge opening 38 (shown in FIG. 5) in discharge structure 34. The diameter dimension of basket 18 and chlorination chamber 4 would be selected according to the diameter dimension of the type of sanitizing/treatment tablet 30 selected for use, with basket 18 closely positioned around the sanitizing/treatment tablets 30 apart from the distance required for easy addition and/or removal of sanitizing/treatment tablets 30 to/from basket 18, as needed. A pivoting handle 20 is attached to the upper edge of basket 18, and shown in FIG. 2 in its compact storage position. Basket 18 also has a slanted bottom surface 32 and opposing guides 22 attached to the upper outside surface of the basket 18 that are configured for alignment and engagement with corresponding notches 50 in the inside upper surface of chlorination chamber 4. One of the guides 22 and one of the notches 50 is enlarged with respect to its opposing guide 22 or notch 50, so that basket 18 fits only one way into chlorination chamber 4 to automatically align slanted bottom surface 32 in close proximity with the similarly inclined interior bottom surface 58 of chlorination chamber 4, shown in FIGS. 9 and 10. Thus, when basket 18 is placed in its position of use within chlorination chamber 4, it substantially fills the hollow interior of chlorination chamber 4. FIG. 2 also shows cover 6 positioned above basket 18, which is attached via threads 24 on the upper outside surface of chlorination chamber 4 and used to prevent any treatment vapors from escaping out of chlorination chamber 4 during condensate treatment therein. Cover 6 also keeps dirt, debris, insects, spiders, lizards, rodents, rainwater, and other undesirable objects from entering basket 18 and chlorination chamber 4, as well as providing a safety benefit by concealing sanitizing/treatment tablets 30 and making them inconvenient to access by young children (not shown). FIG. 2 shows mounting bracket 12 poised for sliding vertical connection to one of the support brackets 8 attached to the outside surface of chlorination chamber 4, and the concave upper surface 10 of support bracket 8, which is usable for support of connection fitting 40, shown behind chlorination chamber 4. Both support brackets 8 are similarly configured so that mounting bracket 12 can be alternatively connected to the opposing support bracket 8 hidden behind chlorination chamber 4 in FIG. 2 and currently being used under connection fitting 40 for its support. Although FIG. 2 shows threads 24 on the upper surface of chlorination chamber 4 being used to securely fix cover 6 thereto, it is also contemplated for covers 6 of other configurations to be used, such as but not limited to snap-fit covers, locking covers, hinged covers, and childproof covers. Condensate (not shown) enters the most preferred embodiment 2 via connection fitting 40 and passes through first p-trap 14. Float ball 26 within valve housing 62 prevents fluid communication between first p-trap 14 and second strap 16, unless sufficient condensate has accumulated in first p-trap 14 and first tubing 52 to overcome the weight of float ball 26 and temporarily push it upward within the area created for its movement by fastening ridges 44 and wings 60 (unmarked in FIG. 2, but shown and clearly marked in FIG. 11). Condensate that has moved past float ball 26 and out of valve housing 62, then moves through second p-trap 16, through third tubing 56 and toward the inlet structure 42 on the inlet side of chlorination chamber 4, and then through inlet opening 28. The laterally diverted path the condensate takes through chlorination chamber 4 is shown in detail in FIGS. 9 and 10. Once the condensate is treated by vapors released from tablets 30 placed within basket 18 and positioned directly over the condensate while it is in chlorination chamber 4, it leaves through the discharge opening 38 that is centrally located through discharge structure 34. Discharge opening 38 is not shown in FIG. 2, but visible in FIG. 4 extending through the lower portion of chlorination chamber 4 centrally between opposed support brackets 8. Since condensate treatment is gravity assisted, discharge structure 34 is purposefully placed in a reduced height position relative to inlet opening 28.

Figure 3:
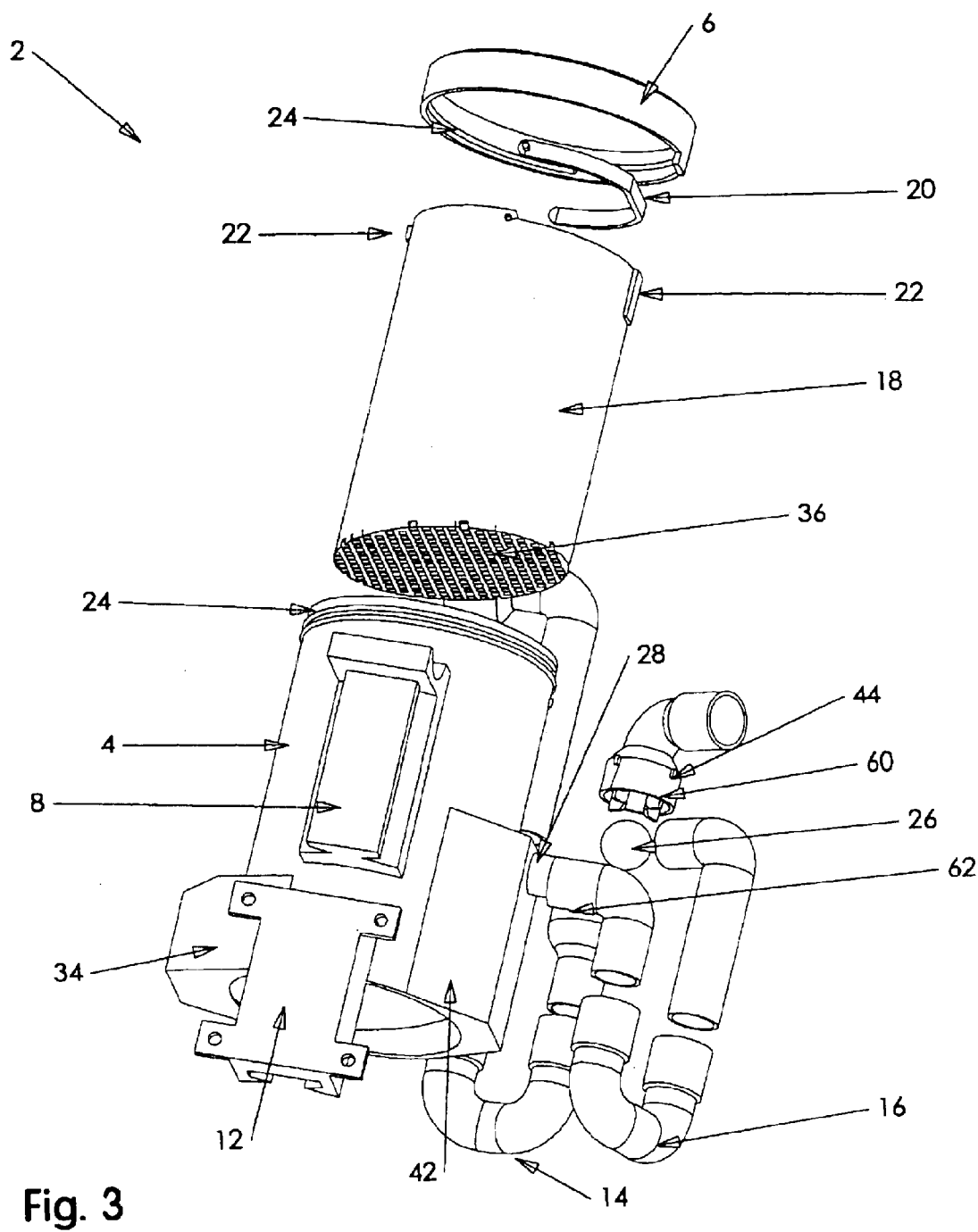
FIG. 3 is an exploded right side view of the most preferred embodiment of the present invention with the cap and basket removed from the chlorination chamber, the bottom surface of the basket having a mesh structure and being inclined, a float ball positioned between P-traps, and a mounting bracket poised for sliding engagement with a support bracket.

FIG. 3 also shows an exploded view the most preferred embodiment 2 of the present invention. Cooperating threads 24 on the inside of cover 6, as well as on the top edge of chlorination chamber 4, provide the secure sealing needed between them to prevent the escape of any sanitizing vapors (not shown) from chlorination chamber 4 during condensate treatment. Further, FIG. 3 shows the opposing alignment guides 22 on basket 18, one longer and wider than the other, which could have different length dimensions than are shown, a handle 20 between basket 18 and cap 6 that is attached to the upper portion of basket 18 for use in moving basket 18 in and out of chlorination chamber 4, and basket 18 having a mesh bottom surface 36 configured for movement of sanitizing vapors therethrough, but not fragments of the dissolvable sanitizing/treatment tablets 30 placed thereon from traveling below mesh bottom surface 36. In addition, mesh bottom surface 36 creates even wear in tablets 30 from bottom to top, for more efficient use of tablets 30. The openings in mesh bottom surface 36 can consist of any pattern, size, and configuration as long as they allow mesh bottom surface 36 to fulfill its needed functions. FIG. 3 also shows the two p-traps 14 and 16 with float ball 26 positioned therebetween within valve housing 62, one support bracket 8 being used for the attachment of mounting bracket 12, raised inlet opening 28 between second p-trap 16 and the inlet structure 42 on the inlet side of chlorination chamber 4, and discharge structure 34 in an opposed and lowered position from inlet structure 42. Float ball 26 is lifted periodically within valve housing 62 by the accumulated condensate in p-trap 14 whereby a portion of the accumulated condensate is allowed to flow into p-trap 16 and thereafter into inlet opening 28 and through chlorination chamber 4. However, most of the time float ball 26 is drawn downward by gravity to block sanitizing vapors from traveling back into the air conditioning system (not shown) providing the condensate used for treatment. Several wings 60 are positioned within an area above the upper portion of valve housing 62 above the area within which float ball 26 moves, and extend downwardly into the lower portion of valve housing 62 to centrally position float ball 26 therein so as to allow even flow of condensate around it and into second p-trap 16.

Figure 7:
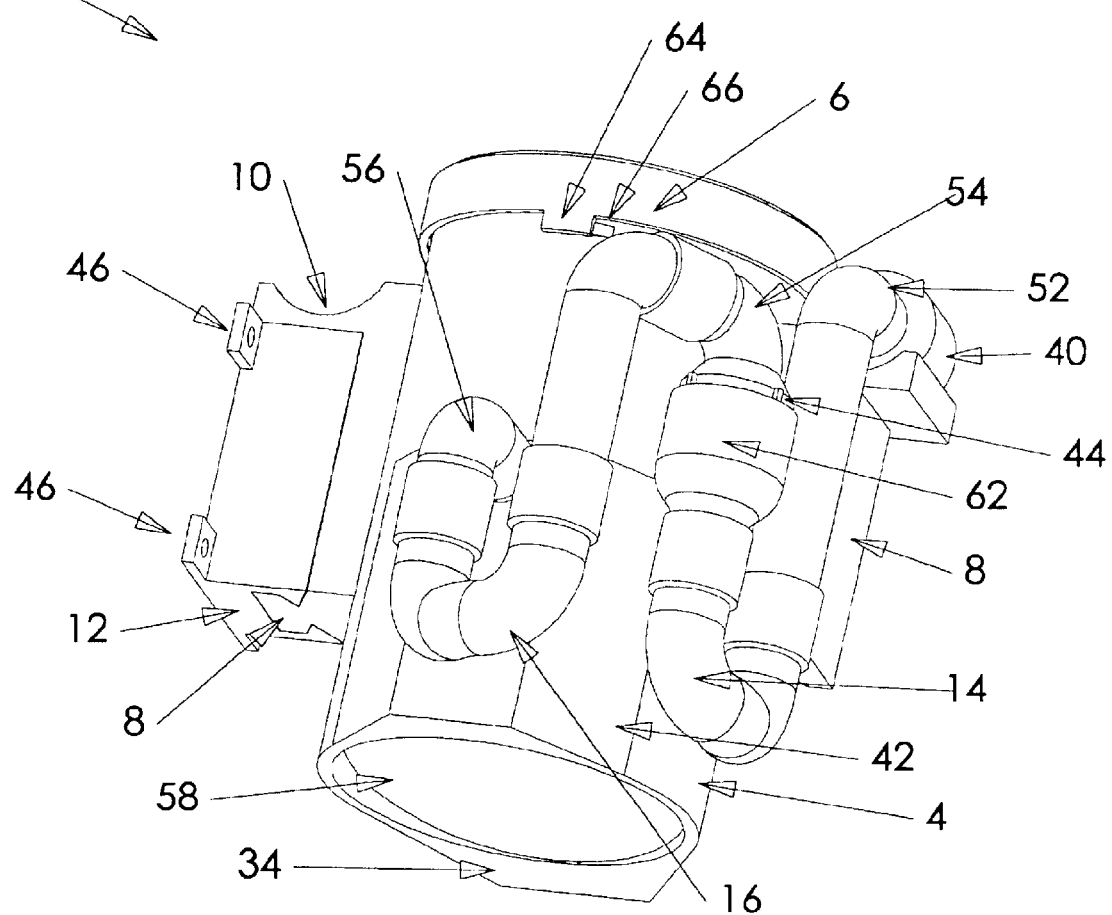
FIG. 7 is a bottom perspective view of the most preferred embodiment of the present invention having two successive p-traps positioned between its chlorination chamber and its connection fitting configured for attachment to the discharge pipe of an air conditioning system, and a mounting bracket attached to one of the two opposed support brackets outwardly depending from the outside surface of the chlorination chamber.

FIGS. 4–7 also show several additional views of the external structure of the most preferred embodiment 2 to provide a better understanding of the structure and spatial relationship between its components. FIGS. 4 and 5 show the back of most preferred embodiment 2 with lowered discharge opening 38 centrally positioned through its surrounding discharge structure 34. Although FIGS. 6 and 7 each show discharge structure 34 depending from chlorination chamber 4, the discharge opening 38 therethrough is hidden from view. FIGS. 4–7 all show two support brackets 8 in opposing positions on the outside surface of chlorination chamber 4, and each having a configuration identical to the other so they may be used interchangeably. Support brackets 8 are centrally positioned between discharge structure 34 and cap 6, with each having a concave upper surface 10. In FIGS. 5 and 7, one support bracket 8, is shown supporting connection fitting 40 within its concave upper surface 10, with the other support bracket 8 being used with mounting bracket 12 or connection fitting 40 for vertical sliding attachment of a mounting bracket 12. The configuration of mounting bracket 12 is not critical and may vary from that shown in FIGS. 4–7. The fastener mounts 46 on each mounting bracket 12 can be used to secure chlorination chamber 4 to a stationary object, such as but not limited to an adjacent wall or fence structure, to prevent chlorination chamber 4 from being adversely affected by casual contact or weather. FIGS. 4 and 7 show valve housing 62 positioned between p-traps 14 and 16, as well as the fastener ridges 44 above valve housing 62 that provides the area within valve housing 62 where float ball 26 can move. FIGS. 4–7 further show cover 6 attached to the upper end of chlorination chamber 4, as well as first, second, and third tubing 52, 54, and 56, respectively, positioned in descending order between connection fitting 40 and inlet structure 42. Cover 6 may have a handle or otherwise be different in appearance from that shown in FIGS. 4–7, as long as it effectively fulfills its vapor containing and protective functions. FIG. 7 shows an exterior view of the bottom surface 58 of chlorination chamber 4. Although the interior bottom surface 58 of chlorination chamber 4 must be inclined for transfer of treated condensate from inlet opening 28 to discharge opening 38, however the exterior portion of bottom surface 58 can be inclined as shown in FIG. 10, or not as its configuration does not affect sanitizing treatment function. A decision as to whether exterior bottom surface 58 should be thickened on one side to make it substantially horizontal would be made according to manufacturing and material waste considerations. FIG. 7 further shows a tab 64 and a flange 66 that make cover 6 child-resistant.

Figure 8:
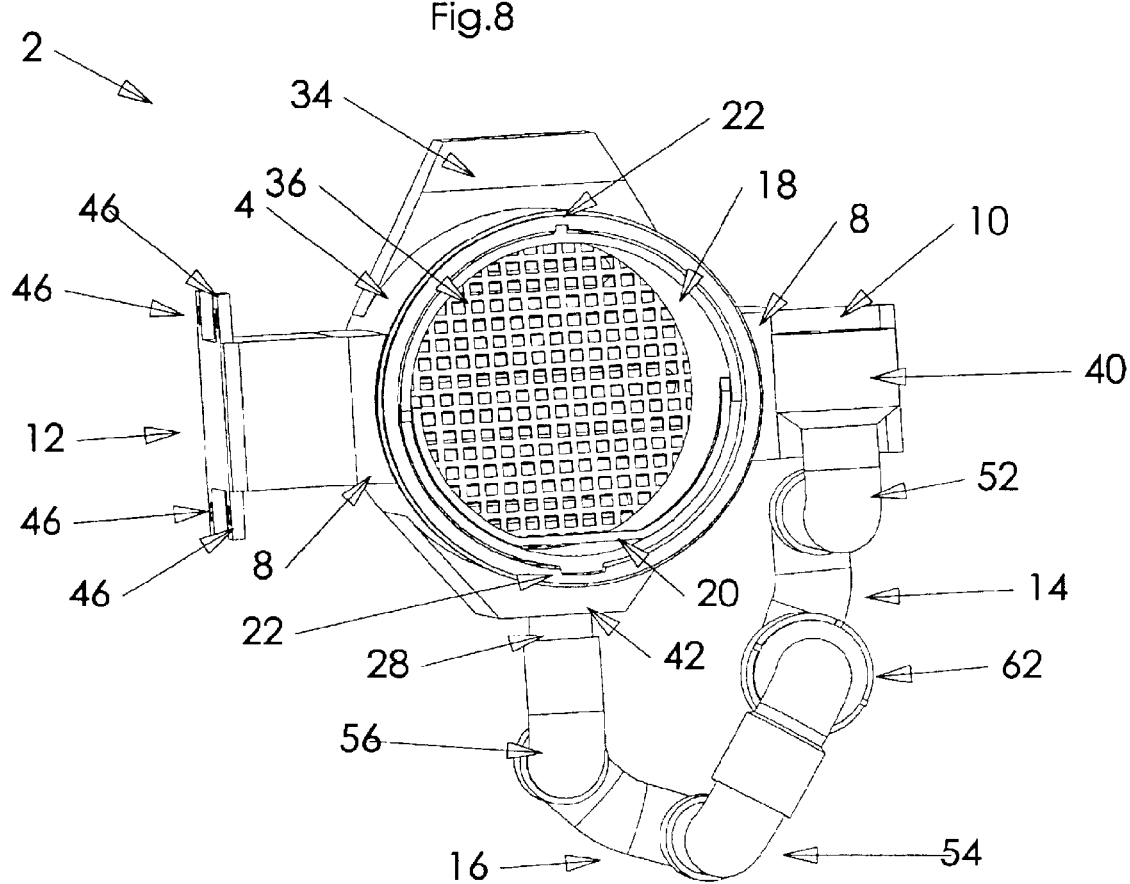
FIG. 8 is a top view of the most preferred embodiment of the present invention having a basket with an angled mesh bottom configured for holding the treatment tablets being centered within its chlorination chamber, the chamber's cover removed, opposed support brackets outwardly depending from the outside surface of the chlorination chamber, the connection fitting supported within the concave upper surface of one of the support brackets, the other support bracket connected to a mounting bracket, an inlet opening structure centrally between the opposed support brackets on one side of the chlorination chamber, a discharge opening structure between the opposed support brackets on the other side of the chlorination chamber in a position opposed to the inlet structure, and two p-traps connected between the inlet support structure and its connection fitting configured for attachment to the discharge pipe of an air conditioning system.

FIGS. 8–10 show the interior of chlorination chamber 4 in the most preferred embodiment 2 of the present invention. FIG. 8 shows basket 18 centrally positioned within chlorination chamber 4, with handle 20 attached to the upper surface of basket 18. In FIG. 8, handle 20 is shown in its pivotally compact storage configuration, flush with the upper edge of basket 18. FIG. 8 also shows two opposing guides 22 on the outside upper surface of basket 18, one wider than the other, that are used to align the mesh bottom surface 36 (which is also inclined) of basket 18 into a substantially parallel position with the also slanted bottom interior surface 58 of chlorination chamber 4. In addition, FIG. 8 shows one support bracket 8 connected to a mounting bracket 12 with several fastener mounts 46 on mounting bracket 12. The size and configuration of fastener mounts 46 are not critical. FIG. 8 also shows connection fitting 40, first tubing 52, first p-trap 14, second tubing 54, second p-trap 16, and third tubing 56 all aligned in an end-to-end configuration so as to be fluid communication with one another for delivering air conditioning condensate to inlet opening 28 centrally within the inlet structure 42 on the outside surface of chlorination chamber 4. The raised end of the slanted/mesh bottom surface 36 of basket 18 is positioned adjacent to inlet structure 42, with the lower end of mesh bottom surface 36 being positioned adjacent to discharge structure 34. Cover 6 is removed and not shown in FIG. 8. FIG. 9 shows the same structure visible in FIG. 8, with basket 18 removed to reveal five parallel and spaced-apart ridges 48 upwardly depending from the bottom surface 58 of chlorination chamber 4. The number of ridges 48 used is not critical, although they do need to be spaced apart and oriented to create a pattern of condensate flow that is laterally directed to allow the condensate to be in close proximity to sanitizing/treatment tablets 30 between its entrance into chlorination chamber 4 at inlet opening 28 and its exit from discharge opening 38, for a sufficient period of time to obtain the amount of bacteria and algae elimination needed for the condensate in its intended application once treated. Arrows and arrowheads show the path around ridges 48 taken by the air conditioning condensate as it travels via gravity from inlet opening 28, laterally across the downwardly inclined interior bottom surface 58 of the chlorination chamber 4 toward discharge opening 38, and then out of chlorination chamber 4 for use in other applications (not shown), instead of discard as an air conditioning system waste product. FIG. 9 also shows a large and small notch 50 on the upper end of chlorination chamber 4 that are used for alignment and engagement with the respectively large and small guides 22 on the upper surface of basket 18, that are shown in FIG. 8. Notches 50 and guides 22 align basket 18 within chlorination chamber 4 so that slanted bottom surface 32 of basket 18 is aligned closely to inclined interior bottom surface 58 of chlorination chamber 4. FIG. 10 shows the inclined mesh bottom surface 36 of basket 18 being supported upon ridges 48 upwardly depending from the interior bottom surface 58 of chlorination chamber 4, with the angled interior bottom surface 58 of chlorination chamber 4 being substantially parallel to one another. Although not limited thereto, for the most preferred embodiments of the present invention, the optimal angle of inclination for interior bottom surface 58 would be approximately 10–15°. As shown in FIG. 10, inlet opening 28 does not empty condensate directly into basket 18 where tablets 30 are located, but allows condensate to fall down onto interior bottom surface 58 adjacent to the outside surface of basket 18. Condensate first contacts inclined interior bottom surface 58 on its high side, and then travels laterally across interior bottom surface 58 under the influence of gravity and around ridges 48 toward discharge opening 38. Although ridges 48 are shown to be very sharply angled, it is considered within the scope of the present invention for some or all ridges 48 to have other configurations and dimensions, such as but not limited to longer as ridges 48 which are able to maintain the mesh bottom surface 36 of basket 18 above the routinely anticipated fluid level of inflowing condensate. Effective treatment of air conditioning condensate can be accomplished by placing the condensate in close proximity with the vapors (not shown) released from the bottommost sanitizing/treatment tablet 30 in s stack of one or more sanitizing/treatment tablets 30, without direct contact between condensate and tablets 30. When a user removes cover 6, handle 20 can be easily pivoted into a vertically oriented position for removal of basket 18 from chlorination chamber 4 to inspect and replace sanitizing/treatment tablets 30. Although three sanitizing/treatment tablets 30 are shown in FIG. 2 and preferred, it is considered to be within the scope of the present invention for chlorination chamber 4 and basket 18 to have the corresponding dimension for any number of sanitizing/treatment tablets 30 determined optimal for a specific application. Further, although not limited thereto, it is preferred that chlorination chamber 4 and basket 18 each have a substantially cylindrical configuration. The means of connecting cover 6 to chlorination chamber 4 is not critical, and although only a cover 6 with threads 24 is shown, it is also contemplated for cover 6 to have a snap-fit type of connection to chlorination chamber 4, or the configuration of a seal or plug having a threaded connection, childproof cap such as that created by tab 64 and flange 66 in FIG. 7, hinged cover, or cover having other selectively restrictive connection means and/or locking mechanisms that discourage the curiosity of young children. Also, the seal between cover 6 and the upper end of chlorination chamber 4 should be secure, but not unduly difficult for an adult to open so as to not frustrate or otherwise interfere with maintenance activity. Although the substantially cylindrical shape and circular cross-sectional configuration of chlorination chamber 4 is preferred for reduced manufacturing cost considerations, as well as for the fact that it most closely approximates the perimeter configuration of the type of sanitization/treatment tablet 30 that is commonly available for swimming pool chlorination use and contemplated for use in chlorination chamber 4. However, the circular cross-sectional configuration of chlorination chamber 4 is not critical and other cross-sectional configurations are contemplated, such as but not limited to that of a pentagon, hexagon, octagon, or dodecagon. With the size of the air conditioning system (not shown) to which chlorination chamber 4 is connected being taken into consideration, as well as the humidity levels anticipated in the structure being cooled and atmospheric humidity levels in the climate within which the chlorination chamber 4 is being used, it is preferred for the height of chlorination chamber 4 to adequately accommodate a sufficient number of sanitizing/treatment tablets 30 for it to operate for an approximate period of six to eighteen months without the need for introducing additional tablets 30. Further, for maintenance assistance, although not limited thereto, chlorination chamber 4 could be made from translucent, transparent, or partially transparent materials so that an operator (not shown) monitoring chlorination chamber 4 could assess with one quick glance the need for additional sanitizing/treatment tablets 30. When treated air conditioning condensate is contemplated for addition to a swimming pool and pool chlorination tablets are selected for use as sanitizing/treatment tablets 30, it is contemplated for the number of ridges 48 and the angle of interior bottom surface 58 to provide the condensate (shown by broken lines and arrowheads) traveling through the chlorination chamber 4 of the present invention with an appropriate amount of exposure time to the vapors released from sanitizing/treatment tablets 30 to achieve chlorine levels in treated water exiting chlorination chamber 4 through discharge opening 38 that are consistent with that used generally for swimming pools. During manufacture, the height of ridges 48 can be varied and made higher or lower than the ridges 48 shown in FIG. 10, according to design considerations required for differing climates and differing amounts of air conditioning condensate expected to travel through chlorination chamber 4 when associated with different sizes of air conditioning units so that adequate exposure time to sanitizing vapors if achieved. Although not shown, it is contemplated that one or more removable bottom inserts each having ridges 48 with a different height dimension and/or configuration could be used when it is contemplated for treated condensate to be alternatively employed for a variety of applications where less chlorination is acceptable, such as but not limited to toilet flushing or other gray water cleaning use. The cross-sectional configuration of ridges 48 is not critical, and it is also contemplated for the most preferred embodiment 2 to have ridges 48 with other distal end design configurations, such as but not limited to rounded, beveled, or square. However, ridges 48 should be positioned, configured, and provided in sufficient numbers, to laterally divert air conditioning condensate so as to cause its even distribution over interior bottom surface 58 and provide a treatment time suitable to the intended application of the condensate after treatment. Although not shown, should significant seasonal differences be anticipated in the generation of air conditioning condensate or the treated condensate be alternatively diverted for new uses, the height or inclined angle of ridges 48 could be adjusted by providing new ridges 48 in the form of a removable insert that could be superimposed over existing ridges 48, or substituting one set of ridges 48 for another by exchange of inserts that provide ridges 48 at a different inclined angle or height dimension as needed to achieve the minimal exposure time required to give the reclaimed condensate the required level of sanitization appropriate to its intended use. The need for exchange of one insert for another could be determined by operator testing of the chlorine levels in the treated air conditioning condensate flowing from discharge opening 38. When the chlorine level tested is less than that desired, an insert with less inclined or lower ridges 48 could be used. However, it is contemplated for the present invention to operate maintenance-free in the same application for extended periods of time, and for chemical testing of the chlorine levels in the treated condensate to not be routinely required.

The materials from which the most preferred embodiment 2 is made can vary. However, it is critical for chlorination chamber 4, ridges 48, cover 6, tubing 52, 54, and 56 to all be made from materials resistant to direct contact with sanitizing/treatment tablets 30, as well as any sanitizing vapors generated by sanitizing/treatment tablets 30. Also, since it is generally contemplated that the present invention will be installed outdoors and exposed to weathering elements, the materials used for chlorination chamber 4, cover 6, tubing 52, 54, and 56, support brackets 8, and wall support 12, at a minimum should be resistant to UV radiation, as well as resistant to deterioration by any other specific hazard known to exist at its intended location. Manufacture of the present invention could be accomplished by blow molding, injection molding, assembly of preformed individual components, or a combination thereof, with the choice of manufacturing being determined by the anticipated purchase cost to consumers and the expected time period of use without maintenance, parts replacement, or repair. Although most likely used to treat and direct air conditioning condensate for swimming pool refill use, it is also considered to be within the scope of the present invention for the chlorinated condensate treated by chlorination chamber 4 to be collected for other appropriate purposes, such as flushing toilets, pressure washing, and other cleaning uses.

FIG. 11 shows the upper and lower portions of the valve housing 62 of the most preferred embodiment 2 of the present invention with a float ball 26 positioned above the lower portion of valve housing 62. Above float ball 26 are wings 60 that extend downwardly into the lower portion of valve housing 62 during use to center float ball 26 therein so that collected condensate can travel evenly around float ball 26 and toward second p-trap 16. FIG. 11 further shows fastening ridges 44 on the outside surface of the upper portion of valve housing 62. The fastening ridges 44 act as stops to prevent wings 60 from moving too far within valve housing 62 where they might otherwise interfere with float ball 26 and/or the condensate attempting travel through valve housing 62. In FIG. 11, float ball 26 is raised from its position blocking condensate flow, which is achieved when sufficient condensate accumulates within first p-trap 14 to overcome the weight of float ball 26. When the threshold amount of condensate is accumulated, float ball 26 is then raised by the condensate to allow a portion of the collected condensate move past float ball 26 and into second p-trap 16. When the condensate has moved through valve housing 62, float ball 26 is again lowered by the force of gravity into its position blocking fluid communication between first p-trap 14 and second strap 16, whereby sanitizing vapors in chlorination chamber 4 cannot travel back into the air conditioning system providing the condensate for treatment. While four of each are shown in FIG. 11, and in the most preferred embodiment is preferred, the number of fastening ridges 44 and wings 60 used is not critical.

To use the most preferred embodiment 2 of the present invention, an operator (not shown) would securely position chlorination chamber 4 on a stable surface in an easy-to-access, but inconspicuous, location between the discharge tubing of an air conditioning system and a conduit or reservoir (not shown) employed to reclaim the treated condensate and divert it for constructive use. Where desired, for further stabilization of chlorination chamber 4, mounting bracket 12 could be secured to a stationary surface adjacent to chlorination chamber 4 through the use of fastener mounts 46. In most applications it is preferred that the chlorination chamber 4 selected for use has a sanitizing/treatment tablet 30 capacity allowing for continuous and maintenance-free operation during a time period of six months to one year. The operator would then secure connection fitting 40 to the discharge tubing of the air conditioning system (not shown) so that surplus water vapor extracted from the cooled air can flow with the assistance of gravity into chlorination chamber 4. P-traps 14 and 16 prevent treated condensate within chlorination chamber 4 from reversing flow and backing up into the air conditioning system where it would be likely to cause damage. Float ball 26 also assists in protecting the connected air conditioning system from reverse flow of liquid and fumes or sanitizing vapors. When treated condensate is contemplated for swimming pool refill use, although not shown, the operator would also connect a length of chlorine-resistant tubing to discharge opening 38, the other end of which would be placed in fluid communication with the targeted swimming pool intended for receipt of the treated condensate. It is also contemplated for the steps of connecting discharge opening 38 and connection fitting 40 to be reversed in order. Once chlorination chamber 4 is secured in its usable position, the operator would assess the number of sanitizing/treatment tablets 30 needed for uninterrupted maintenance-free operation during a time period of approximately one year to eighteen months, or at least a minimum time period of approximately six months, and then place that number of tablets 30 in a stacked configuration within basket 18, followed by insertion of basket 18 into chlorination chamber 4. Minimal maintenance is contemplated. Thereafter, the operator would secure cover 6 over the top opening in the upper end of chlorination chamber 4 and determine a schedule for routine monitoring necessary to determine when replacement tablets 30 should be added. If chlorination chamber 4 is made from translucent, transparent, or partially transparent materials, between scheduled maintenance activity the operator could assess the need for additional sanitizing/treatment tablets 30 with one quick glance, without removal of cover 6. Cover 6 could also be made from translucent, transparent, or partially transparent materials. Further, although not shown, cover 6 could have a handle to facilitate its removal from chlorination chamber 4. The size, configuration, and pattern of openings used for mesh bottom surface 36, as well as its overall size and thickness dimension, are not critical and can vary depending upon design and price point considerations, such as but not limited to, ease of manufacture, the amount of condensate flow anticipated from the air conditioning system (not shown) to which it is contemplated for the present invention to be connected, and the chlorine levels needed in the treated condensate (not shown) to prepare it for its subsequent application. Although not critical, but preferred, it is contemplated for both support brackets 8 to be secured to opposing sides of chlorination chamber 4 prior to installation, unless they are already a molded part of the structure of chlorination chamber 4. All other components would preferably be configured so as to fit within basket 18, including p-traps 14 and 16, and tubing 52, 54, and 56. Thus, with cover 6 in place over the open top end of chlorination chamber 4, a compact package is created for its sale. An installer would be able to assemble p-traps 14 and 16, and tubing 52, 54, and 56, and secure them between an air conditioning discharge tube (not shown) and the inlet opening 28 in chlorination chamber 4 using PVC cement or other commonly available bonding agent or adhesive.

Although not limited thereto and provided only by way of example, the most preferred embodiment 2, as shown in FIGS. 1–11, could have one or more of the following dimensions. When chlorination chamber 4 has a vertical height of approximately six inches, a cylindrical configuration, an inside diameter of approximately three-and-one-half inches, and a wall thickness of approximately one-eighth of an inch, it is preferred that basket 18 has a vertical height on its shorter side of approximately four-and-one-half inches, a vertical height on its longer side of approximately five-and-one-fourth inches, an inside diameter dimension of approximately three inches, and a wall thickness of approximately one-sixteenth of an inch. The support brackets 8 attached to the outside surface of chlorination chamber 4 would preferably have a length dimension of approximately three inches and a width dimension of approximately one inch, while the mounting bracket 12 to be slidably attached to one of the support brackets 8 would have a preferred length dimension of approximately two-and-three-fourths inches, a width dimension of approximately one inch, and a thickness dimension of approximately three-fourths of an inch. Also, the fastener mounts 46 attached to mounting bracket 12 would preferably have a one-half inch square configuration, with a one-eighth of an inch thickness dimension. Further, the material used for p-trap 14 and 16, as well as for tubing 52, 54, and 56 would have an inside diameter dimension of approximately five-eighths of an inch, with a wall thickness of approximately one-sixteenth of an inch. P-traps 14 and 16 would each have a width dimension of approximately two-and-one-fourth inches, with tubing 52 preferably having a vertical height of approximately five-and-three-fourths inches, tubing 54 preferably having a vertical height of approximately five inches, and tubing 56 preferably having a vertical height of approximately three inches. In addition, fastener ridges 48 preferably are approximately one-fourth of an inch in length, and approximately one-sixteenth of an inch in width and thickness, while valve housing 62 is approximately one-and-one-fourth inches in diameter and approximately one inch in height, with wings 60 being approximately one-half inch in length, approximately one-fourth of an inch in width, and approximately one-sixteenth of an inch in thickness. The corresponding float ball 26 for positioning against wings 60 within valve housing 62 would preferably have a diameter dimension of approximately three-fourths of an inch. Also, for most purposes, the angle of inclination for the interior bottom surface 58 of chlorination chamber 4 would be approximately 10–15°, however, the angle could be varied during manufacture, or with the use of replaceable inserts, depending upon the need to have greater or lesser concentrations of chlorine in the treated condensate according to the intended use. Further, although not limited thereto, in the most preferred embodiment 2 of the present invention it is contemplated for ridges 48 to have a width dimension of approximately three-sixteenths of an inch, with the spaced-apart distance between ridges 48 also being approximately three-sixteenths of an inch. Also, the gap between the unattached end of each ridge 48 and the inside wall of chlorination chamber 4 would preferably be approximately three-sixteenths of an inch.

I claim:

1. A sanitizing system for air conditioning condensate from an air conditioning system that collects, treats and diverts the condensate for constructive applications, said system comprising:

a source of sanitizing vapor to release vapors to sanitize condensate containing algae and disease causing elements;

a basket to house the source of sanitizing vapor having a bottom surface with at least one aperture formed therethrough dimensioned to retain the source of sanitizing vapor in said basket;

a hollow chamber to house said basket and the source of sanitizing vapor, said hollow chamber including a side wall having an inlet opening and a discharge opening formed therethrough;

condensate discharge tubing coupled to the air conditioning system;

a fluid flow control operatively coupled between said condensate discharge tubing and said inlet opening such that air conditioning condensate is fed from the source of condensate through said air conditioning condensate discharge tube, said fluid flow control and said inlet opening to the interior of said housing;

said fluid flow control adapted to prevent the sanitizing vapors from back flowing to the air conditioning system from which the condensate was derived whereby the condensate is sanitized by the vapors as the condensate moves through said hollow chamber to said discharge opening.

2. The sanitizing system of claim 1 wherein said bottom surface comprises an inclined bottom surface.

3. The sanitizing system of claim 1 wherein said fluid flow control comprises a p-trap.

4. The sanitizing system of claim 1 wherein said bottom surface comprises an inclined bottom surface and said fluid flow control comprises a p-trap.

5. A sanitizing system for air conditioning condensate from an air conditioning system that collects, treats and diverts the condensate for constructive applications, said system comprising:

a source of sanitizing vapor to release vapors to sanitize condensate containing algae and disease causing elements;

a hollow chamber having a bottom surface with at least one aperture formed therethrough to house the source of sanitizing vapor, said hollow chamber including a side wall having an inlet opening and a discharge opening formed therethrough;

condensate discharge tubing coupled to the air conditioning system;

a fluid flow control operatively coupled between said condensate discharge tubing and said inlet opening such that air conditioning condensate is fed from the source of condensate through said air conditioning condensate discharge tube, said fluid flow control and said inlet opening to the interior of said housing;

said fluid flow control adapted to prevent the sanitizing vapors from back flowing to the air conditioning system from which the condensate was derived whereby the condensate is sanitized by the vapors as the condensate moves through said hollow chamber to said discharge is opening.

6. The sanitizing system of claim 5 wherein said bottom surface comprises an inclined bottom surface.

7. The sanitizing system of claim 5 wherein said fluid flow control comprises a p-trap.

8. The sanitizing system of claim 5 wherein said bottom surface comprises an inclined bottom surface and said fluid flow control comprises a p-trap.

* * * * *